US 9,335,415 B2

(12) United States Patent
Jungwirth (10) Patent No.: US 9,335,415 B2
(45) Date of Patent: May 10, 2016

(54) MODULATED LASER RANGE FINDER AND METHOD

(71) Applicant: The Boeing Company, Chicago, IL (US)

(72) Inventor: Douglas R. Jungwirth, Porter Ranch, CA (US)

(73) Assignee: The Boeing Company, Chicago, IL (US)

( * ) Notice: Subject to any disclaimer, the term of this patent is extended or adjusted under 35 U.S.C. 154(b) by 18 days.

(21) Appl. No.: 13/664,518

(22) Filed: Oct. 31, 2012

(65) Prior Publication Data

US 2014/0118718 A1    May 1, 2014

(51) Int. Cl.
| | |
|---|---|
| *G01C 3/08* | (2006.01) |
| *G01B 11/26* | (2006.01) |
| *G01S 17/32* | (2006.01) |
| *G01S 7/493* | (2006.01) |

(52) U.S. Cl.
CPC ............... *G01S 17/325* (2013.01); *G01S 7/493* (2013.01)

(58) Field of Classification Search
CPC ..... G01S 7/493; G01S 17/325; G01S 17/023; G01B 11/26; G01C 3/08
USPC ........................................................ 356/5.09
See application file for complete search history.

(56) References Cited

U.S. PATENT DOCUMENTS

| | | | |
|---|---|---|---|
| 4,743,110 A * | 5/1988 | Arnaud et al. ............... | 356/5.09 |
| 4,820,047 A * | 4/1989 | Snyder .......................... | 356/484 |
| 4,861,158 A * | 8/1989 | Breen ........................... | 356/5.09 |
| 4,930,865 A * | 6/1990 | Dosmann ...................... | 359/629 |
| 5,030,824 A * | 7/1991 | Babbitt ..................... | 250/227.12 |
| 5,069,545 A | 12/1991 | Hinz | |
| 5,075,878 A * | 12/1991 | Ohtomo et al. ............... | 702/176 |
| 5,164,784 A | 11/1992 | Waggoner | |
| 5,745,237 A * | 4/1998 | Yahiro et al. .................. | 356/615 |
| 6,100,516 A | 8/2000 | Nerin et al. | |
| 6,600,564 B1 * | 7/2003 | Wang et al. .................... | 356/484 |
| 7,576,839 B2 * | 8/2009 | Carnegie et al. ............. | 356/28.5 |
| 7,777,866 B1 | 8/2010 | Kyrazis | |
| 7,986,397 B1 | 7/2011 | Tiemann et al. | |

(Continued)

FOREIGN PATENT DOCUMENTS

| | | |
|---|---|---|
| JP | 7-208946 A | 8/1995 |
| JP | 7-208946 A | 8/1995 |
| JP | 3513432 B2 | 3/2004 |

OTHER PUBLICATIONS

"Laser Doppler Velocimetry," Wikipedia: The Free Encyclopedia (2012).

(Continued)

*Primary Examiner* — Luke Ratcliffe
*Assistant Examiner* — Vicente Rodriguez
(74) *Attorney, Agent, or Firm* — Walters & Wasylyna LLC (57) ABSTRACT

A laser range finder including a laser configured to project a laser beam onto a target object thereby causing a target beam to be reflected from the target object, wherein the laser beam has a frequency, and wherein the frequency is modulated at a known rate, a first beam splitter positioned to split a reference beam from the laser beam, a second beam splitter positioned to receive the target beam and the reference beam, wherein the target beam and the reference beam are coherently combined, the coherently combined beams establishing a difference frequency, and a detector configured to measure the difference frequency.

20 Claims, 7 Drawing Sheets

(56) References Cited

U.S. PATENT DOCUMENTS

2006/0262319 A1    11/2006   Gatt
2007/0127009 A1    6/2007   Chen et al.
2008/0001022 A1*   1/2008   Sa et al. .......................... 244/3.1

OTHER PUBLICATIONS

Extended European Search Report, EP 13 19 1142 (2014).

European Patent Office, Examination Report, EP 13 191 142.2 (Dec. 8, 2015).

First Office Action, State Intellectual Property Office of PRC, CN 201310532671.8 (Aug. 20, 2015).

English Translation of First Office Action, State Intellectual Property Office of PRC, CN 201310532671.8 (Aug. 20, 2015).

Agishev, "Analytic comparison of some features of pulse-laser and CW-FM-ladar remote sensing," *Laser Radar Technology and Applications VIII*, Proceedings of SPIE, vol. 5086 (2003).

* cited by examiner

MODULATED LASER RANGE FINDER AND METHOD

FIELD

This application relates to the measurement of distance to a target object and, more particularly, to the use of a frequency modulated laser beam to measure the distance to a target object.

BACKGROUND

Laser range finders project a laser beam to measure the distance to a target object. Traditional laser range finders are relatively compact, while still providing relatively accurate distance measurements. Therefore, traditional laser range finders are used in a variety of applications, such as sporting applications (e.g., golf and hunting), construction applications (e.g., surveying) and military applications (e.g., target acquisition).

Traditional laser range finders commonly employ the "time of flight" method for measuring distance. A time of flight laser range finder typically includes a laser and a detector. The laser projects a laser pulse toward a target object and initiates a clock. The detector detects backscattering as a result of the laser pulse hitting the target object. The clock is tolled upon initial detection of backscattering. The time difference between projection of the laser pulse and initial detection of backscattering is the time of flight (i.e., the time it took for light to pass from the laser range finder, to the target object, and then back to the laser range finder). The distance to the target object is then calculated by multiplying the time of flight by the speed of light and dividing by two (the distance to the target object is half the distance traveled).

Since traditional "time of flight" laser range finders measure distance based on the first detection of backscattering, such laser range finders are limited to detecting only one object (i.e., the first object within the path of the laser pulse). Furthermore, only the distance to the leading edge of the target object is measured. Therefore, the utility of traditional "time of flight" laser range finders is limited.

Accordingly, those skilled in the art continue with research and development efforts in the field of laser range finders.

SUMMARY

In one embodiment, the disclosed laser range finder may include a laser configured to project a laser beam onto a target object thereby causing a target beam to be reflected from the target object, wherein the laser beam has a frequency, and wherein the frequency is modulated at a known rate, a first beam splitter positioned to split a reference beam from the laser beam, a second beam splitter positioned to receive the target beam and the reference beam, wherein the target beam and the reference beam are coherently combined, the coherently combined beams establishing a difference frequency, and a detector configured to measure the difference frequency.

In another embodiment, the disclosed laser range finder may include a laser configured to project a laser beam onto a target object thereby causing a target beam to be reflected from the target object, wherein the laser beam has a frequency, and wherein the frequency is modulated at a known modulation rate, a first beam splitter positioned to split a reference beam from the laser beam, a second beam splitter positioned to receive the target beam and the reference beam, wherein the target beam and the reference beam are coherently combined, the coherently combined beams establishing a difference frequency, and a detector configured to measure the difference frequency and calculate the distance to the target object based on the measured difference frequency and the known modulation rate.

In another embodiment, the disclosed method for measuring a distance to a target object may include the steps of (1) projecting a continuous laser beam onto the target object, thereby causing a target beam to reflect from the target object, wherein the laser beam has a frequency; (2) modulating the frequency at a known modulation rate; (3) splitting a reference beam from the laser beam; (4) coherently combining the target beam with the reference beam, wherein the coherently combined beams establish a difference frequency; (5) measuring the difference frequency; and (6) calculating the distance based on the measured difference frequency and the known modulation rate.

Other embodiments of the disclosed modulated laser range finder and method will become apparent from the following detailed description, the accompanying drawings and the appended claims.

DETAILED DESCRIPTION

Figure 1:
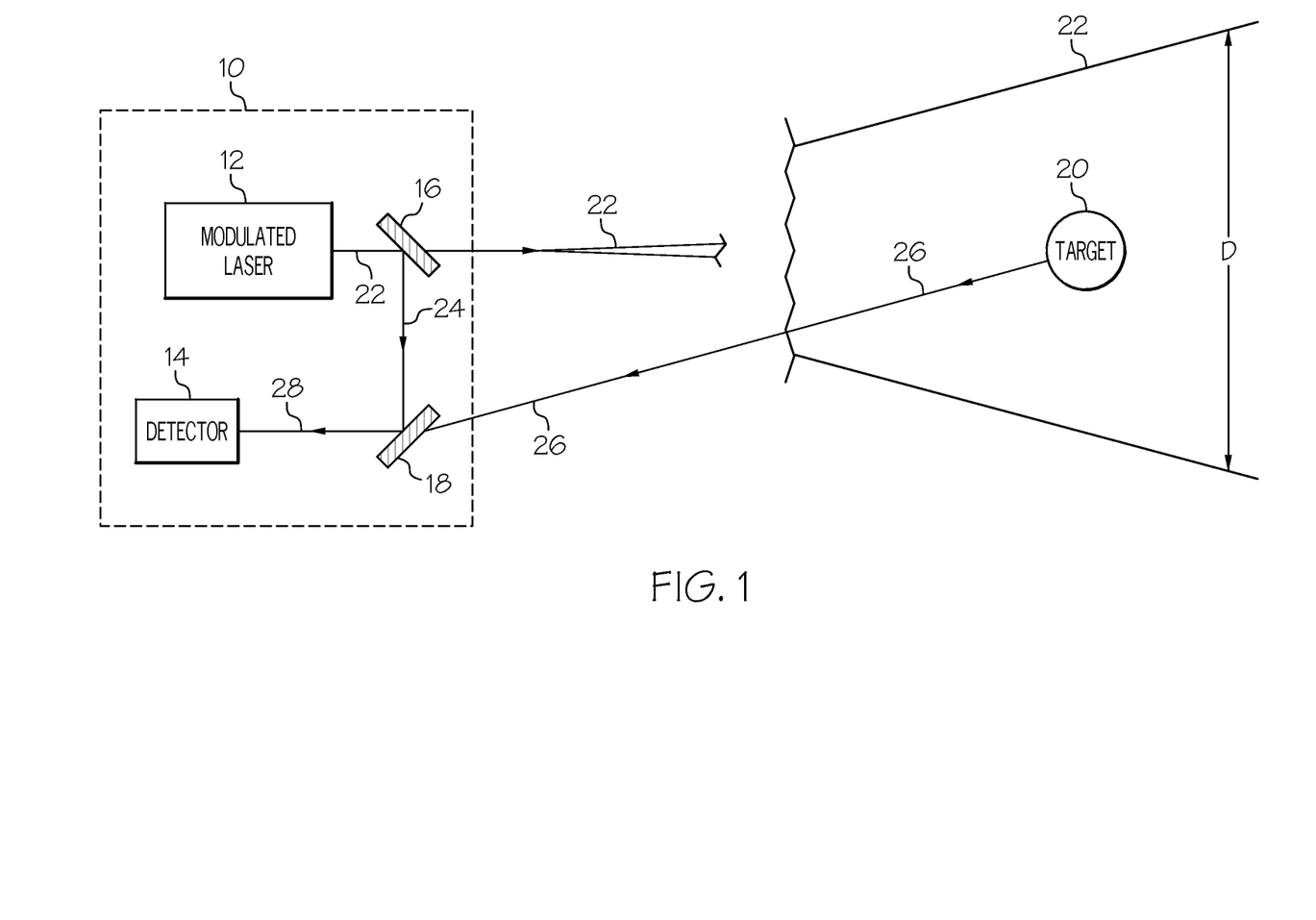
FIG. 1 is a schematic representation of one embodiment of the disclosed modulated laser range finder, shown detecting a target object.

Referring to FIG. 1, one embodiment of the disclosed modulated laser range finder, generally designated 10, may include a laser 12, a detector 14, a first beam splitter 16 and a second beam splitter 18. The modulated laser range finder 10 may be employed to measure the distance to, and optionally depth, acceleration, scattering cross-section and/or angular position of, a target object 20.

The laser 12 may project a continuous laser beam 22 toward the target object 20. The diameter D of the laser beam 22 at a given distance from the laser 12 may be a function of the beam divergence (e.g., 1 degree), which may depend on, among other things, the type of laser 12 selected for use in the modulated laser range finder 10. Therefore, the field of view of the modulated laser range finder 10 may increase with distance from the modulated laser range finder 10.

The laser 12 may continuously modulate the frequency of the laser beam 22 at a known frequency modulation rate. Any available technique may be used to modulate the frequency of the laser beam 22, provided that the modulation rate is known (for subsequent signal processing). Frequency modulation may be effected by the laser 12 itself (i.e., modulation may be integral with the laser 12). Alternatively, an additional component, such as a frequency modulator, may be employed (e.g., may be positioned in the path of the laser beam 22) to modulate the frequency of the laser beam 22 projected toward the target object 20.

Figure 3:
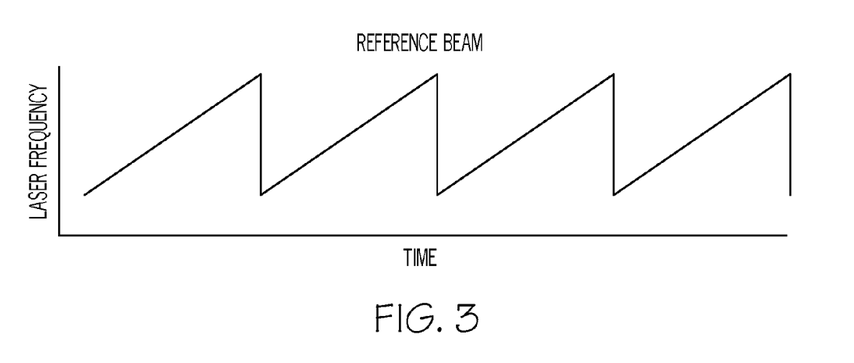
FIG. 3 is a graphical representation of frequency versus time of the reference beam of the modulated laser range finder of FIG. 1.

The frequency modulation rate may be linear. FIG. 3 provides a graphical representation of the frequency of the laser beam 22 being modulated at a set linear rate. However, use of a non-linear frequency modulation rate is also contemplated, and will not result in a departure from the scope of the present disclosure.

As one specific, non-limiting example, the laser beam 22 projected by the laser 12 may be a 477 tHz laser beam, and may be modulated at 1 Hz per second, as follows: 477 tHz at t=0 s; 477 tHz+1 Hz at t=1 s; 477 tHz+2 Hz at t=2 s; 477 tHz+3 Hz at t=3 s; 477 tHz+4 Hz at t=4 s; 477 tHz+5 Hz at t=5 s; 477 tHz+6 Hz at t=6 s; 477 tHz+7 Hz at t=7 s; 477 tHz+8 Hz at t=8 s; 477 tHz+9 Hz at t=9 s; 477 tHz at t=10 s; 477 tHz+1 Hz at t=11 s; and so on.

The first beam splitter 16 may split off a portion (e.g., a relatively small portion) of the laser beam 22 to yield a reference beam 24. The reference beam 24 may be directed to the second beam splitter 18 and, ultimately, to the detector 14.

The balance of the laser beam 22 (i.e., the portion of the laser beam 22 less the split off reference beam 24) may be projected toward the target object 20. As the laser beam 22 impacts the target object 20, backscattering may cause a target beam 26 to return toward the modulated laser range finder 10.

The second beam splitter 18 may receive both the reference beam 24 and the target beam 26. With proper orientation of the first and second beam splitters 16, 18, the target beam 26 may be aligned in parallel with, and may be coherently added to, the reference beam 24. The coherently combined reference and target beams 24, 26 may be passed to the detector 14 as coherently combined beams 28. The reference beam 24 may flood the detector 14.

Figure 4:
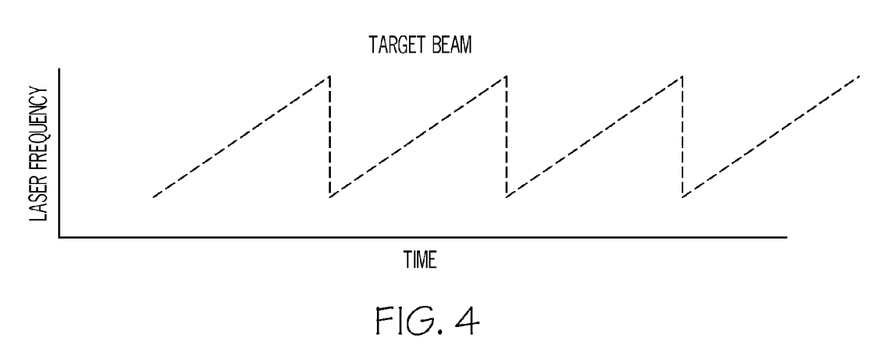
FIG. 4 is a graphical representation of frequency versus time of the target beam received by the modulated laser range finder of FIG. 1.
Figure 5:
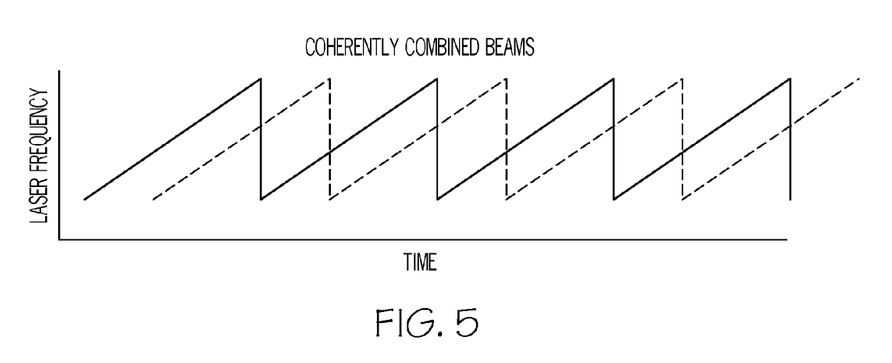
FIG. 5 is a graphical comparison of FIGS. 3 and 4, which shows a shift in time due to the travel time of the modulated laser beam.

As shown in FIGS. 3-5, at any given time, the frequency of the reference beam 24 (FIG. 3) at the detector 14 may be different than the frequency of the target beam 26 (FIG. 4) at the detector 14. The shift shown in FIG. 5 may be due to the time delay between the target beam 26 and the reference beam 24 due to the time of flight of the target beam 26 from the modulated laser range finder 10, to the target object 20, and then back to the modulated laser range finder 10.

Figure 6:
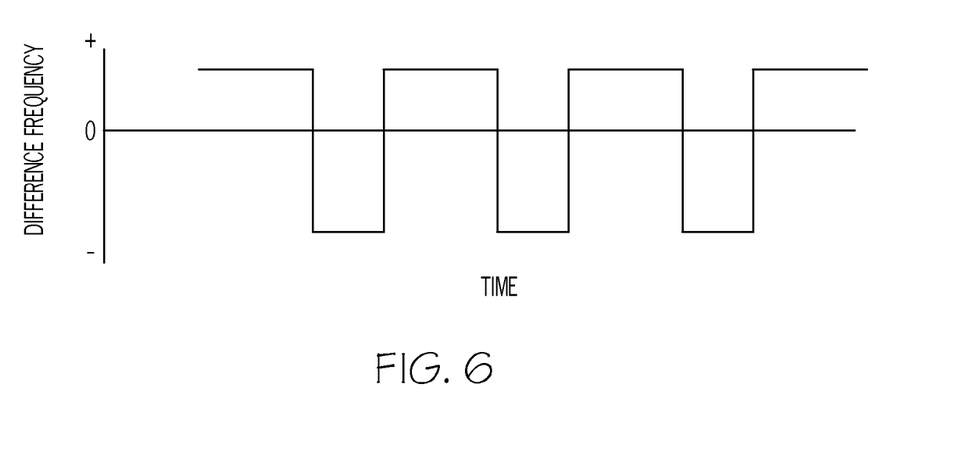
FIG. 6 is a graphical representation of the difference frequency versus time resulting from coherent addition of the target beam of FIG. 4 with the reference beam of FIG. 3.

Thus, as shown in FIG. 6, the coherently combined beams 28 may generate a harmonic that is the difference frequency (or beat frequency) between the reference beam 24 and the target beam 26. The difference frequency, $\omega_{beat}$, can be expressed as follows:

$$\omega_{beat} = \omega_1 - \omega_2$$

where $\omega_1$ is the frequency of the reference beam 24 and $\omega_2$ is the frequency of the target beam 26.

The difference frequency may be directly proportional to the time delay between the reference beam 24 and the target beam 26. The time delay may be calculated based on the difference frequency and the known frequency modulation rate. For example, the time delay may equal the difference frequency divided by the frequency modulation rate. Since the speed of light is known, the time delay may be converted to a distance by multiplying the time delay by the speed of light and dividing by two. Therefore, the difference frequency may also be directly proportional to the distance to the target object 20.

The detector 14 may receive the coherently combined beams 28 and may determine the distance to the target object 20 based on the difference frequency of the coherently combined beams 28. The detector 14 may detect the difference frequency of the coherently combined beams 28 rather than the individual frequencies of the reference and target beams 24, 26. The detector 14 may employ various techniques to detect the difference frequency of the coherently combined beams 28. For example, the detector 14 may be an optical detector configured to observe the difference frequency of the coherently combined beams 28.

Figure 2:
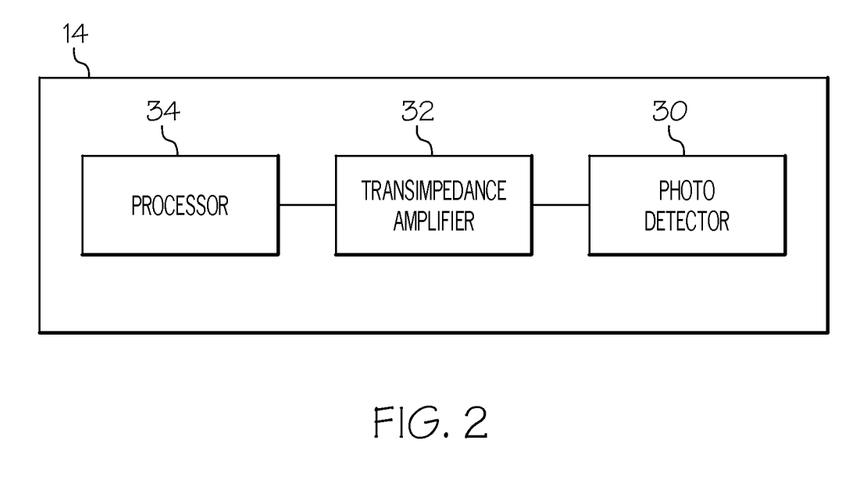
FIG. 2 is a schematic block diagram of the detector of the modulated laser range finder of FIG. 1.

Referring to FIG. 2, in one particular implementation, the detector 14 may include a photo detector 30, a transimpedance amplifier 32 and a processor 34. Additional components (e.g., a display, a memory) may be associated with the detector 14 without departing from the scope of the present disclosure.

The photo detector 30 may be any device that generates an electronic signal in response to the coherently combined beams 28 (FIG. 1). In one particular construction, the photo detector 30 may be a photodiode or the like, and may create free electrons (i.e., a current) in response to incident photons. For example, the photodiode may include a silicon wafer having a p-n junction.

The intensity of the coherently combined beams 28 at the detector 14 may be a function of the frequency $\omega_1$ of the reference beam 24 and the frequency $\omega_2$ of the target beam 26, and may be proportional to:

$$(\sin(\omega_1) + \sin(\omega_2))^2$$

which equals:

$$\sin^2(\omega_1) + \sin^2(\omega_2) + \cos(\omega_1 - \omega_2) - \cos(\omega_1 + \omega_2)$$

Therefore, the current generated by the photo detector 30 may oscillate at the difference frequency of the coherently combined beams 28.

Figure 7:
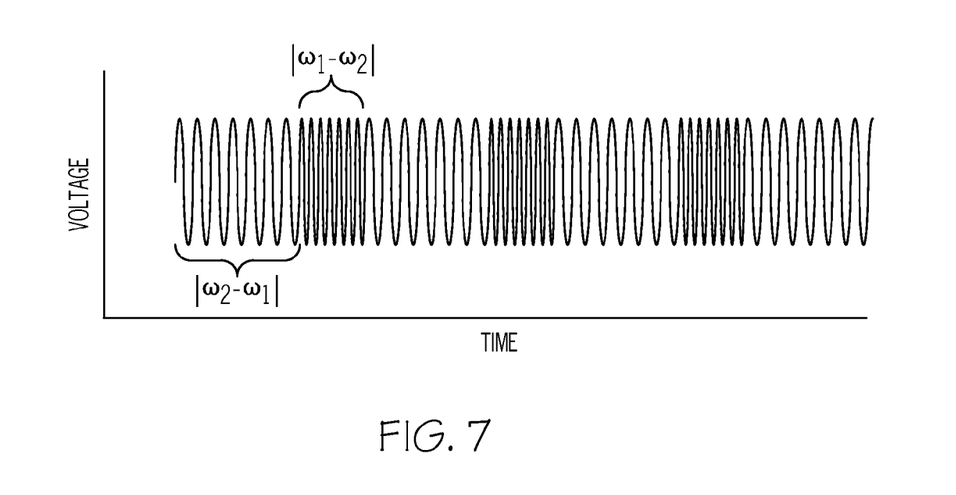
FIG. 7 is a graphical representation of the optical signal (voltage versus time) observed due to coherent addition of the target beam of FIG. 4 with the reference beam of FIG. 3.

The transimpedance amplifier 32 may be coupled to or otherwise associated with the photo detector 30 to convert the current generated by the photo detector 30 into a processable voltage signal. As the coherently combined beams 28 interact with the photo detector 30 to free electrons, the transimpedance amplifier 32 may generate a voltage signal that closely corresponds to the difference frequency of the coherently combined beams 28, as shown in FIG. 7.

The processor 34 may be any apparatus or system (e.g., a computer processor comprising hardware and software) capable of receiving and processing a signal. Therefore, the processor 34 may receive the voltage signal from the transimpedance amplifier 32, and may process the voltage signal to determine the difference frequency of the coherently combined beams 28 and, using the known frequency modulation rate, the distance to the target object 20 (FIG. 1).

Various techniques may be used to process the voltage signal received from the transimpedance amplifier 32 to determine the difference frequency of the coherently combined beams 28 without departing from the scope of the present disclosure. As one example, the processor 34 may use Fourier transform analysis to process the voltage signal received from the transimpedance amplifier 32. As another example, the processor 34 may use a frequency to voltage converter to process the voltage signal received from the transimpedance amplifier 32.

Accordingly, the disclosed modulated laser range finder 10 may determine the distance to a target object 20 by projecting a frequency modulated laser beam 22 onto the target object 20 and observing the difference frequency between the reference beam 24 and the target beam 26 reflected from the target object 20. Since the frequency modulation rate is known, the distance to the target object 20 may be determined from the observed difference frequency.

Figure 8:
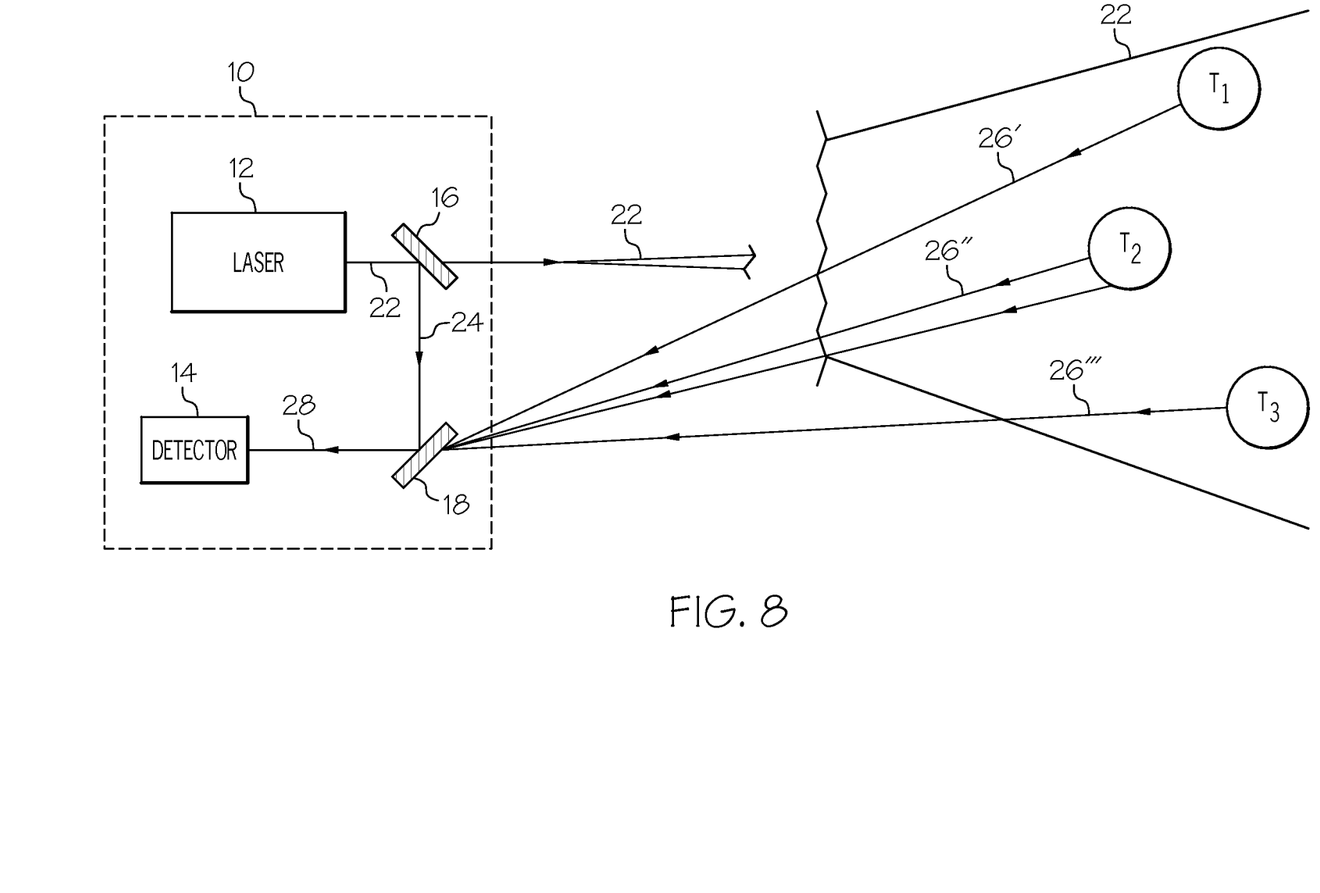
FIG. 8 is a schematic representation of the modulated laser range finder of FIG. 1 detecting multiple target objects.

While only one target object is shown in FIG. 1, the disclosed modulated laser range finder 10 may simultaneously determine the distance to multiple target objects $T_1$, $T_2$, $T_3$, as shown in FIG. 8. Each target object $T_1$, $T_2$, $T_3$ within the field of view of the laser beam 22 may reflect a target beam 26', 26", 26''' back to the modulated laser range finder 10. Each target beam 26', 26", 26''' may be coherently combined with the reference beam 24 to produce coherently combined beams 28 that are directed to the detector 14. The detector 14 may observe the various difference frequencies within the coherently combined beams 28, which may be superimposed over each other, and may determine multiple distances based on the multiple difference frequencies.

At this point, those skilled in the art will appreciate that the ability to continuously and simultaneously process multiple target beams 26', 26", 26''', each associated with a different distance, may be useful even when there is only one target object within the field of view of the laser beam 22. Specifically, the ability to simultaneously process multiple target beams 26', 26", 26''' may facilitate calculating the scattering cross-section of a target object, the depth of the target object and/or the acceleration of the target object. For example, the depth of a target object may be determined based on the distance to the leading edge of the target object and the distance to the trailing edge of the target object. Additionally, even if two targets are in the same line of sight, both targets may provide signals (target beams) capable of being detected by the disclosed modulated laser range finder 10, thereby allowing the disclosed modulated laser range finder 10 to see through targets and/or see multiple targets in the same line of sight.

Optionally, the disclosed modulated laser range finder 10 may be mounted on a pan-tilt mechanism, as is known in the art. The pan-tilt mechanism may control the pan and tilt angles of the modulated laser range finder 10 such that the laser beam 22 may be scanned over a target area (i.e., to facilitate scanning of the laser beam 22). When a target object 20 is detected, the distance to the target object 20 may be determined, as described above. Additionally, the pan and tilt angles at the time of detection may be used to determine the azimuth and elevation angles of the target object relative to the modulated laser range finder 10. The measured distance, the azimuth and elevation angles, and any additional data, such as the location and speed of the modulated laser range finder 10, may then be used to calculate the spatial coordinates of the target object (e.g., relative to the position of the modulated laser range finder 10), as is known in the art.

Figure 9:
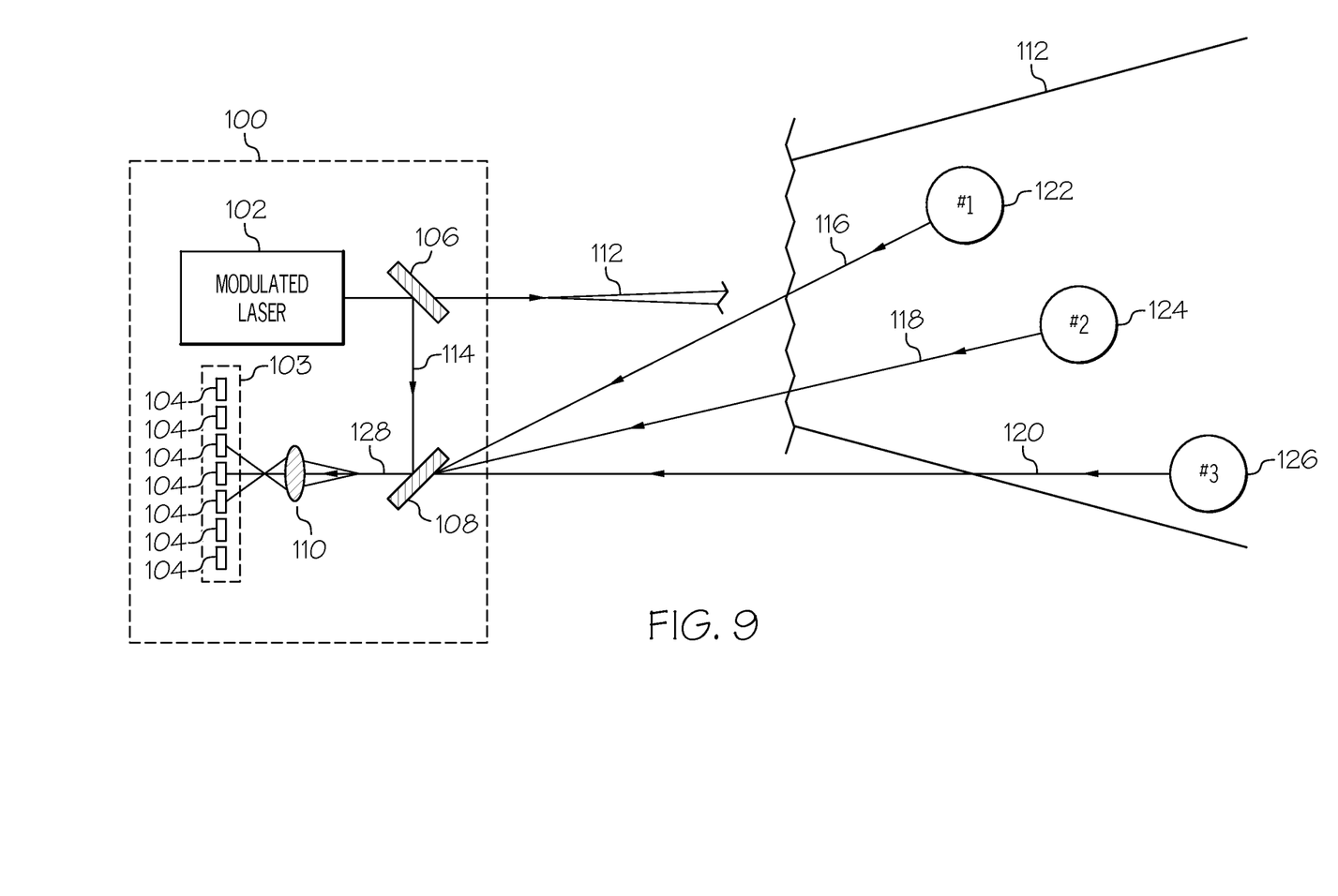
FIG. 9 is a schematic representation of another embodiment of the disclosed modulated laser range finder.

Referring to FIG. 9, another embodiment of the disclosed modulated laser range finder, generally designated 100, may include a laser 102, a plurality of detectors 104, a first beam splitter 106, a second beam splitter 108 and a lens 110. The detectors 104 may be arranged in an array 103, such as a two-dimensional array having rows and columns of detectors 104. Various configurations of the array 103 are contemplated and are within the purview of one of ordinary skill in the art.

The laser 102 may project a continuous laser beam 112. The first beam splitter 106 may split off a portion of the laser beam 112 to yield a reference beam 114, which may be directed to the second beam splitter 108. The second beam splitter 108 may receive the reference beam 114, as well as the target beams 116, 118, 120 reflected from target objects 122, 124, 126 within the path of the laser beam 112. The target beams 116, 118, 120 may be aligned with and coherently combined with the reference beam 114, and the resulting coherently combined beams 128 may be projected onto the array 103 of detectors 104 such that the various difference frequencies may be observed.

Each detector 104 within the array 103 may be independent, and may be configured to conducts its own signal processing. Therefore, a data cloud may be created representing signals received at each detector 104 of the array 103.

The lens 110 may focus the coherently combined beams 128 onto the array 103 of detectors 104. The detectors 104 receiving the light, and the intensity of the received light, may vary depending on the position of the target objects 122, 124, 126 relative to the lens 110. Therefore, using an array 103 of detectors 104 may provide relatively greater spatial resolution (as compared to using only one detector 104) in addition to distance measurement.

Figure 10:
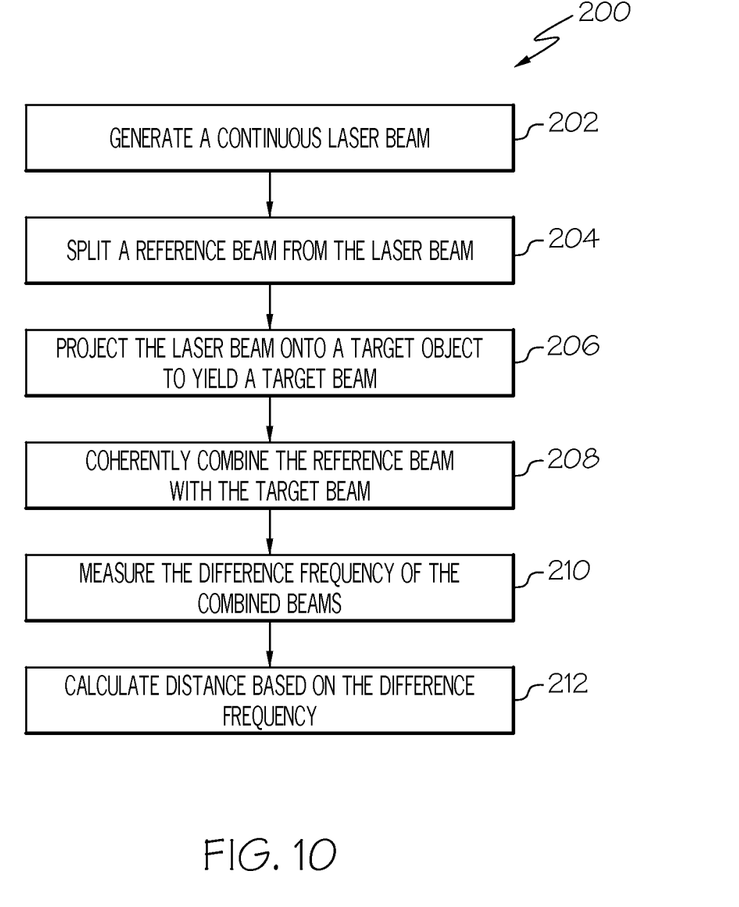
FIG. 10 is a flow chart depicting one embodiment of the disclosed method for measuring distance to a target object.

Referring to FIG. 10, also disclosed is a method, generally designated 200, for measuring the distance to a target object. The method 200 may begin at Block 202 with the step of generating a continuous laser beam, wherein the frequency of the laser beam is modulated at a known frequency modulation rate. At Block 204, a reference beam may be split from the laser beam. At Block 206, the laser beam may be projected onto a target object, which may result in a target beam being reflected from the target object. At Block 208, the target beam may be coherently combined with the reference beam, which may establish a difference frequency. At Block 210, the difference frequency may be measured. Finally, at Block 212, the distance to the target object may be calculated based on the difference frequency and the known frequency modulation rate.

Although various embodiments of the disclosed modulated laser range finder and method have been shown and described, modifications may occur to those skilled in the art upon reading the specification. The present application includes such modifications and is limited only by the scope of the claims.

What is claimed is:

1. A laser range finder comprising:
   a laser configured to project a laser beam onto a plurality of target objects thereby causing a plurality of target beams to be reflected from said plurality of target objects, wherein said laser beam has a frequency, and wherein said frequency is modulated at a known linear modulation rate;
   a first beam splitter positioned to split a reference beam from said laser beam;
   a second beam splitter positioned to receive said plurality of target beams and said reference beam, wherein said plurality of target beams and said reference beam are coherently combined to form coherently combined beams, wherein said coherently combined beams simultaneously establish difference frequencies based from a difference between a frequency of said reference beam and frequencies of said plurality of target beams at a given time, and wherein said difference frequencies are directly proportional to time delays between said reference beam and said plurality of target beams; and a detector configured to simultaneously measure distances to said plurality of target objects based from said difference frequencies.

2. The laser range finder of claim 1 wherein said time delays are based from said difference frequencies divided by said linear modulation rate, wherein said distances to said plurality of target objects are based from said time delays, and wherein said difference frequencies are directly proportional to said distances to said plurality of target objects.

3. The laser range finder of claim 1 wherein said linear modulation rate of said frequency of said laser beam varies linearly as a function of time from an initial frequency to a final frequency and oscillates from said final frequency to said initial frequency.

4. The laser range finder of claim 1 wherein said detector comprises a photo detector.

5. The laser range finder of claim 4 wherein said photo detector creates currents oscillating at said difference frequencies.

6. The laser range finder of claim 5 wherein said detector further comprises a transimpedance amplifier configured to convert said currents into a voltage signals.

7. The laser range finder of claim 6 wherein said detector further comprises a processor configured to determine said difference frequencies based from said voltage signals and said distances to said plurality of target objects based from said difference frequencies and said linear modulation rate.

8. The laser range finder of claim 1 wherein said detector is an optical detector.

9. The laser range finder of claim 1 wherein said laser beam is projected continuously, and wherein said laser beam is continuously modulated at said linear modulation rate.

10. A method for simultaneously measuring distances to a plurality of target objects, said method comprising the steps of:
   continuously projecting a laser beam onto said plurality of target objects, thereby causing a plurality of target beams to reflect from said plurality of target objects, wherein said laser beam has a frequency;
   continuously modulating said frequency at a known linear modulation rate;
   splitting a reference beam from said laser beam;
   coherently combining said plurality of target beams with said reference beam to form coherently combined beams, wherein said coherently combined beams establish difference frequencies;
   measuring, simultaneously, said difference frequencies, wherein said difference frequencies are based from a difference between a frequency of said reference beam and frequencies of said plurality of target beams at a given time, and wherein said difference frequencies are directly proportional to time delays between said reference beam and said plurality of target beams;
   calculating, simultaneously, said time delays between said reference beam and said plurality of target beams based from said difference frequencies and said linear modulation rate; and
   calculating, simultaneously, said distances to said plurality of target objects based from said time delays between said reference beam and said plurality of target beams.

11. The method of claim 10 further comprising the steps of:
    determining azimuth and elevation angles of said plurality of target objects; and
    calculating spatial coordinates of said plurality of target objects based on said calculated distances and said azimuth and elevation angles.

12. The method of claim 10 further comprising the step of scanning said laser beam.

13. The method of claim 10 further comprising the step of calculating depths of said plurality of target objects.

14. The method of claim 10 further comprising the step of calculating scattering cross-sections of said plurality of target objects.

15. The method of claim 10 further comprising the step of calculating accelerations of said plurality of target objects.

16. The method of claim 10 wherein said measuring step comprises projecting said coherently combined beams onto a photo detector.

17. The method of claim 10 wherein said measuring step comprises:
    generating voltage signals corresponding to said difference frequencies; and
    analyzing said voltage signals to determine said difference frequencies.

18. The laser range finder of claim 1 wherein said laser beam is projected continuously.

19. The laser range finder of claim 1 wherein said laser beam is continuously modulated at said linear modulation rate.

20. The method of claim 16 wherein said photo detector creates currents oscillating at said difference frequencies.

* * * * *